(12) United States Patent (10) Patent No.: US 12,335,240 B2
Carney et al. (45) Date of Patent: Jun. 17, 2025

(54) CENTRALIZED MANAGEMENT CONTROL LISTS FOR PRIVATE NETWORKS

(71) Applicant: Tailscale Inc., Toronto (CA)

(72) Inventors: David F. Carney, Toronto (CA); Avery Pennarun, Montreal (CA); David J. Crawshaw, Berkeley, CA (US)

(73) Assignee: Tailscale Inc., Toronto (CA)

( * ) Notice: Subject to any disclaimer, the term of this patent is extended or adjusted under 35 U.S.C. 154(b) by 473 days.

(21) Appl. No.: 17/231,215

(22) Filed: Apr. 15, 2021

(65) Prior Publication Data

US 2022/0255905 A1 Aug. 11, 2022

Related U.S. Application Data

(60) Provisional application No. 63/146,767, filed on Feb. 8, 2021.

(51) Int. Cl.
*H04L 9/40* (2022.01)

(52) U.S. Cl.
CPC ........ *H04L 63/0428* (2013.01); *H04L 63/104* (2013.01); *H04L 63/20* (2013.01)

(58) Field of Classification Search
CPC ... H04L 63/0428; H04L 63/104; H04L 63/20; H04L 63/0263; H04L 63/102
See application file for complete search history.

(56) References Cited

U.S. PATENT DOCUMENTS

| | | | | |
|---|---|---|---|---|
| 2007/0019645 | A1* | 1/2007 | Menon | H04L 12/1818 370/390 |
| 2010/0122084 | A1* | 5/2010 | Liu | H04L 63/065 713/163 |
| 2015/0012963 | A1* | 1/2015 | Gupta | H04L 63/104 726/1 |
| 2019/0268341 | A1* | 8/2019 | Hugot | H04L 63/08 |
| 2023/0037386 | A1* | 2/2023 | Scurry | H04W 12/71 |

FOREIGN PATENT DOCUMENTS

| | | | | |
|---|---|---|---|---|
| CN | 110113390 | A * | 8/2019 | |
| CN | 111988307 | A * | 11/2020 | G06Q 50/08 |
| EP | 3091712 | A1 * | 11/2016 | H04L 67/104 |

* cited by examiner

*Primary Examiner* — Michael R Vaughan

(57) ABSTRACT

Described herein are systems, methods, and software to manage private networks for computing elements. In one example, a coordination service may obtain a request from a computing element to join a private network. In response to the request, the coordination service may identify communication rules associated with the computing element based on credential and device information in the request and may identify communication information to permit the computing element to communicate with one or more other computing elements in the private network. Once identified, the communication information may be communicated to the computing element.

18 Claims, 8 Drawing Sheets

CENTRALIZED MANAGEMENT CONTROL LISTS FOR PRIVATE NETWORKS

RELATED APPLICATIONS

This application hereby claims the benefit of and priority to U.S. Provisional Patent Application No. 63/146,767, titled "CENTRALIZED MANAGEMENT CONTROL LISTS FOR PRIVATE NETWORKS," filed Feb. 8, 2021, and which is hereby incorporated by reference in its entirety.

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring individual networks can be difficult and cumbersome. These difficulties are compounded when a network includes different types of computing systems with different firewall and other security measures.

SUMMARY

The technology described herein manages control lists and accessibility for computing elements in a private network. In one implementation, a coordination service manages a private computing network and receives a request from a computing element to join the private communication network, wherein the request indicates credential information associated with the user and device information associated with the device. In response to the request, the coordination service identifies communication rules associated with the credential information and device information and identifies communication information that permits the computing element to communicate with one or more other computing elements in the private communication network based on the communication rules. Once the communication information is identified, the coordination service may communicate the communication information to the computing element.

DETAILED DESCRIPTION

Figure 1:
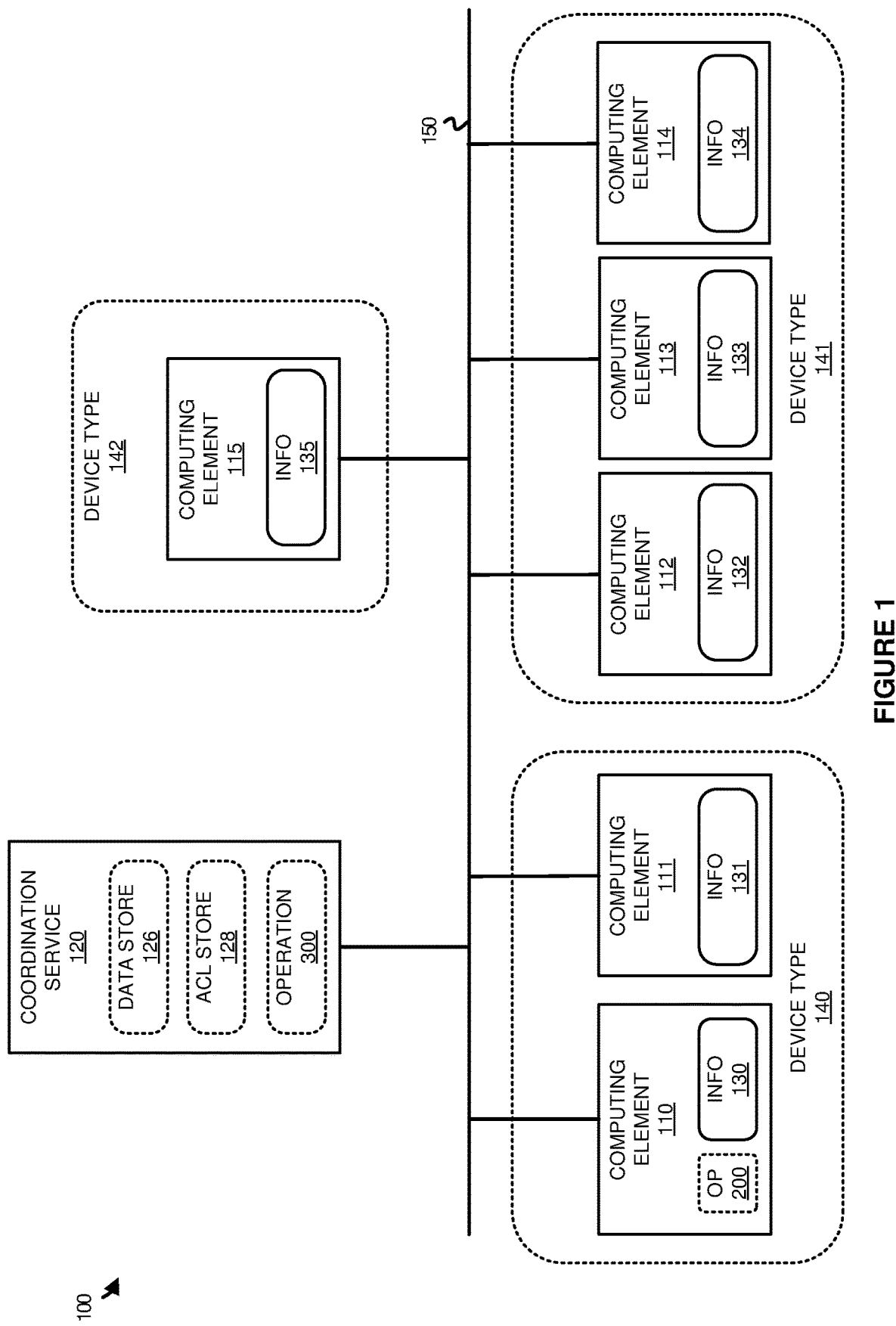
FIG. 1 illustrates a computing environment to manage security and accessibility between computing elements according to an implementation.

The following discussion presents operations and techniques to provide private networking between various computing elements. These computing elements may comprise physical devices, such as desktop computers, servers, tablets, and the like, and may further comprise virtual computing elements, such as virtual machines or other virtualized endpoints. Here, to support private networking, a coordination service is deployed that is capable of managing the connection information for each of the computing elements in the private networks. In at least one example, an application or service may execute on the local computing element that prompts a user for login information. This login information may include a username, password, a token, a key, or some other similar credential, including combinations thereof. Once the login information is provided, the login information may be communicated to an authentication service, which may be provided by the coordination service or some other web service, such as an organization, social media service provider, or some other web service. Once the login information is authorized, the user may be allocated a token for use with their associated profile.

In addition to authorizing the user for the private network, the coordination service may manage communication rules that are used to permit and block communications between the computing elements in the private network. These rules may be configured by one or more users or administrators of the computing environment and may be defined based on credential information associated with the user and device information associated with the device. The credential information may be obtained directly from the user or may be obtained from another web service that identifies the requesting user. The device information may include operating system information, hardware information, services provided by the device, or some other information in association with the device.

When the private computing network is initiated, an administrator may define rules that can be used to manage communication permissions between computing elements as they are added to the network. The computing elements may comprise end user computing devices, such as desktop computers, laptop computers, smartphones, tablets, and the like, may comprise servers, virtual machines, containers, or some other computing element. For example, a rule may permit a plurality of user devices to access a server, wherein an administrator configuring the server may include credentials to make the server available to the users. In some implementations, the users of the private communication network may be allocated to groups, wherein the rules may be defined as user groups, such as engineering, legal, advertising, or some other group. When a new computing element joins the network, the coordination service may determine a user group associated with the user and identify rules associated with the user group. Advantageously, when new devices are added to the private network, rules may be applicable to groups of users rather than assigning rules to individual users.

In some implementations, when a request is received from a computing element to join the private network, the coordination service may identify credential information for the user and device information associated with the computing element. From the information, the coordination service may identify one or more of the communication rules that apply to the computing element and identify communication information to permit the computing element to communicate with one or more other computing elements in the private network. Referring again to the example of rules that permit end user devices to communicate with a server, when a new user device requests to join the network, the coordination service may identify rules that correspond to the computing element. Once identified, the coordination service may identify one or more other computing elements, such as the server, that the user computing element can communicate with. When the other computing elements are identified, the coordination service may identify communication information that permits the computing element to communicate with the other computing elements and provide the communication information to the end user device. For the end user device to communicate with the server, the communication information may include encryption information for packets being communicated to or received from the server, addressing information to communicate with the server, or some other information associated with communicating with the server. In some examples, in addition to providing the information to the new user device, the coordination service may provide communication information to the server that can permit communications with the user device.

After providing the communication information to the user device, a local application executing locally on the device (such as an agent application to support the secure communications) may monitor for communications directed at the server, wherein the communications may be identified by an IP address, URL, a server identifier or name, or some other destination identifier associated with the server. Once identified, the application may apply any communication information associated with the server and forward the communication to the server. The application of the communication information may include network address translation, providing the address for the request as a domain name server (DNS) response, encrypting data for the server, or providing some other operation for the communication. Additionally, when communications are received from other computing elements in the private network, the service may identify the source of the communication and apply any required decryption operations on the communication to support the communication.

In at least one implementation, each of the computing elements in the secure network may be allocated a unique IP address for the network, wherein the IP addresses may comprise a range of IP addresses available for the computing elements. When a communication is required by a computing element, the computing element may use the unique IP address for the private network destination (e.g., 100.64.10.2) allocated to the destination computing element). Once identified, the local application may apply the communication information and communicate the communication to the destination computing element. In some examples, the communication information may be used to encapsulate the communication (using an encryption key) and insert a public IP address for the destination computing element in the header for the encapsulated packet. Once encapsulated, the packet may be forwarded to the destination computing element.

In some examples, a computing element may act as a relay for one or more other computing device or elements that execute on a local network with the computing element. For example, a computing element may comprise a router that is used to permit one or more devices behind the router to communicate using other computing elements in the private network. When a communication is received by the router, the router may identify that the destination corresponds to a computing element in the private network, determine whether the communication is permitted based on the communication information provided from the coordination service, and apply any communication information to the communication prior to transferring the communication to the destination computing element. Similar operations may also be performed on received communications. In particular, a router may receive a communication on a port, decrypt the communication based on the received port and/or source IP address for the communication, and forward the communication to the computing device operating on a local network for the router. Advantageously, a computing element on the private network may provide a relay for one or more other computing devices to connect in the private network.

FIG. 1 illustrates a computing environment 100 to manage private networks for computing systems according to an implementation. Computing environment 100 includes coordination service 120, relay server 122, and computing elements 110-115, wherein computing elements 110-115 correspond to different device types 140-142. Although demonstrated with three different device types, it should be understood that any number of different device types may be used in a private communication network. Computing element 110 implements operation 200, which is further described below with respect to FIG. 2. Coordination service 120 further includes data store 126 and access control list (ACL) store 128. Coordination service 120 implements at least operation 300 that is further described below with respect to FIG. 3. Coordination service 120 and computing elements 110-115 communicate using network 150. Coordination service 120 may execute using one or more physical computing devices, such as servers, desktop computers, or some other computing element. Computing elements 110-115 may be located on the same local area network or may be located across multiple local area networks. For example, computing elements 110-115 may be distributed across multiple geographic locations for an organization, such as field offices, head quarter offices, and the like.

In operation, computing elements 110-115 may use coordination service 120 to allocate and manage a private communication network. Computing elements 110-115 may comprise physical computing devices or may comprise virtualized endpoints, such as virtual machines or containers. On each of the computing elements, an application or service may be used to register and maintain private networking information associated with the computing element. In one implementation, the local application may prompt a user for login information, wherein the login information may be unique to coordination service 120 or may be provided for an authentication service, such as a social media login, corporate login, or some other login. The login information may comprise a username, password, key, or some other information. Once the information is obtained, the authentication service may provide a token that can be used to identify the user for coordination service 120.

In some implementations, in addition to identifying the user, coordination service 120 may, when a login is generated, provide an identifier to the computing element to uniquely identify the computing element. In other examples, the local private networking application providing operation 200 may generate a unique device identifier, wherein the identifier may comprise any number of bits and may be generated using a hash function or some other mechanism to generate a unique identifier. An entry in data store 126 for a computing element may include a token associated with the user and the unique identifier for the specific computing element (together referred to as a "device key"). Other information for the entry may include the public key to decrypt packets from the computing element, device type information, such as operating system, physical computing hardware information, or some other information, and addressing information associated with the computing element (IP addresses, MAC addresses, and the like). At least a portion of the information may then be distributed to other computing elements in the private network. As an example, when computing element 110 joins the private network in computing environment 100, the information about the computing element is provided to coordination service 120 and stored in data store 126. The information may then be distributed to one or more other computing elements in the private network based on communication rules, permitting the one or more other computing elements in private network 140 to communicate with computing element 110.

In some implementations, when a new computing element of computing elements 110-115 attempts to join the private network, the computing element may provide at least credential information associated with the user and device information associated with the computing element. Coordination service 120 may use this information to determine whether the computing element should be permitted to join the computing network, determine one or more other computing elements that the new computing element can communicate with in the private network, identify types of communications between the computing elements, or some other determination in association with permissions for the computing element. In some implementations, coordination service 120 may identify rules that match the information provided in association with the computing element to determine the rules that are applicable from ACL store 128. Once the rules are identified, coordination service 120 may identify communication information that permits the computing element to communicate with one or more other computing elements in accordance with the rules. For example, if computing element 110 were associated with a rule to communicate with computing element 115, then the communication information may include encryption information, such as one or more encryption keys to communicate with computing element 115, addressing information associated with computing element 115, including internet protocol (IP) addressing, port addressing, and the like, or some other information to support the communication from computing element 110 to computing element 115.

In some examples, in addition to configuring the requesting computing element to communicate with one or more computing elements, updates may also be provided to the one or more computing elements to permit the communications from the newly added computing element. The information provided to the one or more other computing elements may include addressing information and encryption information supplied by the computing element, permitting the other computing elements to communicate with the computing element.

Once the communication information is provided to the registering computing element, such as computing element 110, the computing element may use the communication information to communicate with one or more other computing elements permitted by the rules in ACL store 128. The local private network service or application on the computing element may be used to update addressing for a requested communication (e.g., provide DNS or address translation), encrypt or decrypt communications, or provide some other operation for packets that are received or communicated to the one or more other computing elements.

In some implementations, each computing element of computing elements 110-115 may be allocated a unique IP address associated with the private network for computing elements 110-115, wherein the unique address may be provided as part of the communication information. When a communication is required for an application, a computing element may identify that the communication includes one of the unique addresses for another computing element in the private network. For example, computing element 110 may identify a communication directed at the unique IP address for computing element 115. In response to identifying the communication, computing element 110 may determine whether the communication is permitted based on the communication information from coordination service 120. If permitted (e.g., if communication information was provided to support the communication), computing element 110 may apply the communication information. This may include encrypting the communication, adding addressing information, such as a public IP address for computing element 115 and a source public IP address associated with computing element 110, or providing some other operation on the communication prior to forwarding the communication to computing element 115.

In some implementations, in addition to providing the filtering of packets from the sending computing element, the receiving computing element may also determine whether data should be forwarded to a service. In particular, the receiving computing element may identify source addressing (IP address, port, etc.) and determine whether the packet based on the source addressing. If permitted, the receiving computing element may provide decryption using the supplied keys and forward the packet to the destination service.

Figure 2:
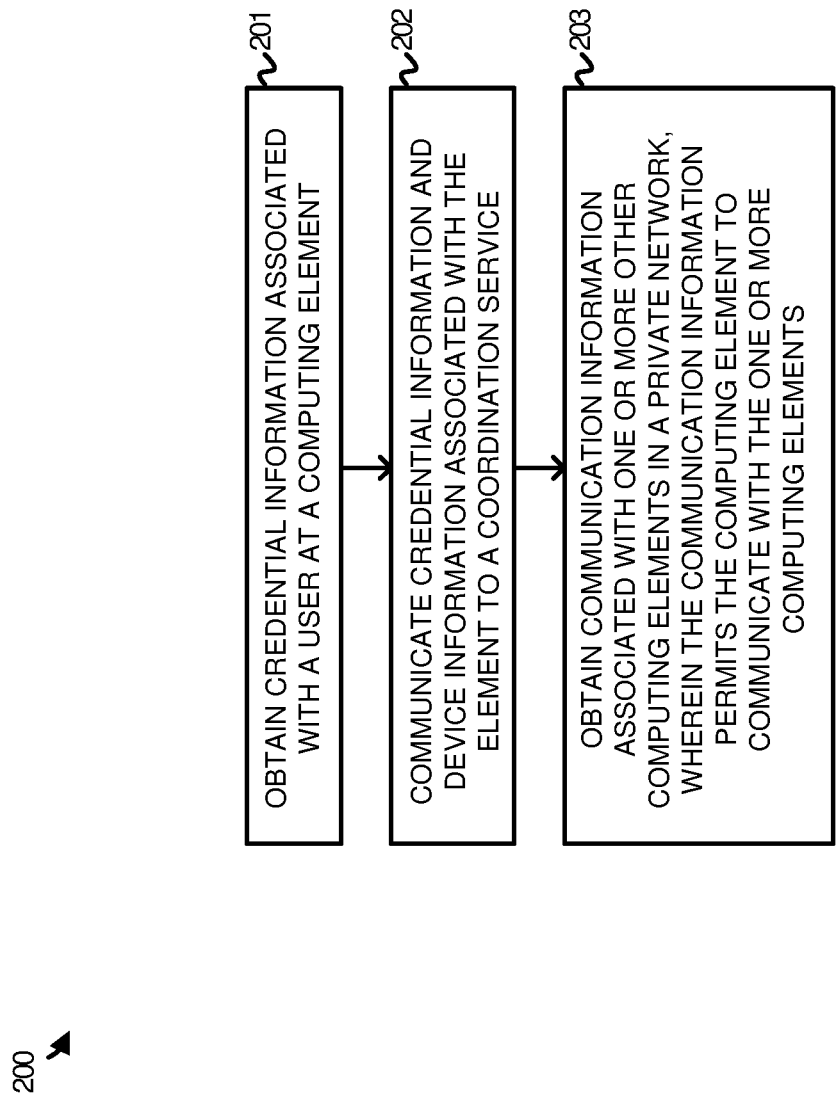
FIG. 2 illustrates an operation of a computing element to request and receive credentials to communicate with one or more other computing elements in a computing environment according to an implementation.

FIG. 2 illustrates an operation 200 of a computing element to request and receive credentials to communicate with one or more other computing elements in a computing environment according to an implementation. The steps of operation 200 are referenced parenthetically in the paragraphs that follow with reference to systems and elements of computing environment 100 of FIG. 1. Although demonstrated using computing element 110, it should be understood that the operations for a computing element to join the private network may similarly be implemented by computing elements 111-115.

As depicted, operation 200 includes obtaining (201) credential information associated with a user a computing element. The credential information may include a username and password, may include a token allocated to a user, or may include some other credential information. Once the credential information is obtained, the computing element communicates (202) the credential information and device information associated with the computing element to the coordination service. In some implementations, first login or credential information may be communicated to an authentication service, which may be provided by the coordination service or some other web service, such as an organization, social media service provider, or some other web service. Once the login information is authenticated, the user may be allocated a token for use with their associated profile and the coordination service. For example, a user may use a Google™ service to provide their credentials and the service may allocate a token that authenticates the user. In other examples, coordination service 120 may provide similar operations that can authenticate the user and subsequently authorize communications in the private network. In some implementations, the credential information that is received by coordination service 120 may include identifier information associated with the user of the computing element, wherein the identifier information may include username, password, token, or some other identifying information. The device information may indicate an operating system, hardware information, services available on the computing element, or some other information related to the computing element. Accordingly, while some of the credential information may be provided directly from the computing element, in some examples portions of the credential information may be provided by a third-party authentication service.

Once the information is provided to the coordination service, the coordination service may identify communication information to be supplied to computing element 110, wherein the communication information may be used by the computing element to communicate with one or more other computing elements in the private network. In some implementations, when a computing element registers with coordination service 120, the computing element may provide public/private encryption key information to establish communications with the computing element, may provide addressing information for the computing element, or may provide some other information that can be maintained in data store 126. In some implementations, only the public key is provided to the coordination service for distribution to other computing elements in the network. Advantageously, no other computing element has access to the private key to forge communications from the registering computing element. When a new computing element registers with coordination service 120, coordination service 120 may identify one or more other computing elements that can communicate with the new computing element and provide communication information for the one or more other computing elements to the new computing element. In some implementations, the communication information may indicate services or applications that are permitted to be accessed on the other computing elements, ports available to be accessed on the other computing elements, types of outgoing/incoming connections available for the computing element, or some other information. For example, the communication information may indicate IP addresses for the destination computing elements (public IP address and unique IP addresses assigned in a subnet by the coordination service) and available ports on each of the computing elements.

Once the information is identified, the coordination service may provide the communication information to computing element 110. Additionally, computing element 110 may obtain (203) the communication information associated with the one or more other computing elements in the private network that permits the computing element to communicate with the one or more computing elements in the private network. For example, the communication rules maintained as part of ACL store 128 may indicate that computing element 110 is permitted to communicate with computing element 115. Consequently, the communication information that is provided to computing element 110 may include addressing information for computing element 115, any encryption information for data from computing element 115, or some other information that permits computing element 110 to communicate with computing element 115. The communication information may further include rules that expressly define addressing (port and/or IP addresses) available for communication with computing element 110.

In some implementations, the communication information may be dynamic, wherein the encryption information and/or addressing for the other computing elements may change based on security requirements, movement of the computing elements, configuration changes, or some other modification. Each of the computing elements may provide coordination service 120 with the updates to the communication information, wherein coordination service 120 may, in turn, distribute the communication information to corresponding computing elements in the private network. In some examples, each of the computing elements may be configured to provide initial communication information for the element and provide supplemental information at intervals. These intervals may be periodic, when a change is made for the communication information or at some other interval.

In some implementations, when a computing element attempts to join the private computing network, the coordination service may allocate a unique IP address in a subnet for the computing element. Advantageously, when the computing element attempts to communicate with other computing elements in the private network, the computing element may use the available addresses in the subnet for other computing elements available to the registering computing element. When a packet is communicated, computing element 110 may determine whether the destination IP address is in the subnet for the private network, determine whether the communication is permitted based on the communication information, and apply any changes to the packet prior to communicating the packet. In some implementations, the changes may include encrypting the packet, adding an encapsulation header that includes a public IP address for the destination computing element, or applying some other operation to the packet. For example, when computing element 110 attempts to communicate with computing element 115, computing element 110 may identify the communication uses a unique address allocated by coordination service 120. Once identified, computing element 110 may determine whether the communication is permitted and, if permitted, encrypt the packet and add public addressing information associated with computing element 115 to support the communication. When the communication is received at computing element 115, computing element 115 may decrypt the packet and forward the packet to the destination application. In some implementations, the receiving computing element may determine whether the communication is permitted based on the source addressing for the communication, based on whether encryption keys were provided for the sending computing element, or based on some other factor. If the communication is deemed to be unpermitted, the communication is blocked from being forwarded to the destination computing element. However, if the communication is permitted, the communication may be decrypted and forwarded to the destination service.

In some examples, computing element 110 may operate as a relay to one or more other computing resources, wherein the resources may comprise other computing systems, printers, or some other computing resource. For example, computing element 110 may represent a router that identifies packets from other computers and applies the communication information to permit or block the packets. In particular, when a packet is identified that is destined for another computing element in the private network, the computing element may determine whether the communication is permitted and apply the communication information to the packet to prepare the packet to be communicated to the destination computing element.

Figure 3:
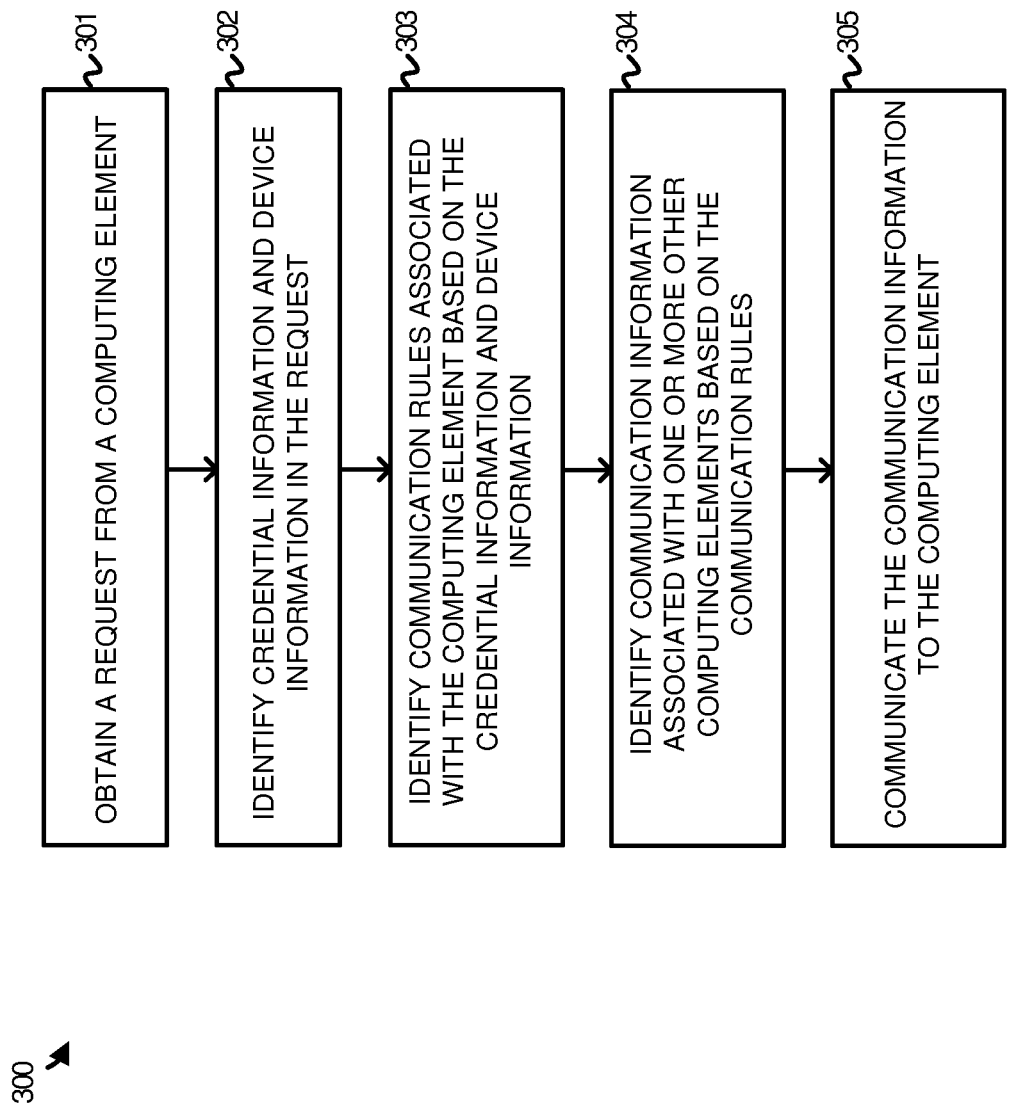
FIG. 3 illustrates an operation of a coordination service to manage security rules for computing elements according to an implementation.

FIG. 3 illustrates an operation 300 of a coordination service to manage security rules for computing elements according to an implementation. The steps of operation 300 are referenced parenthetically in the paragraphs that follow with reference to computing environment 100 of FIG. 1. Although demonstrated as registering computing element 110, it should be understood that similar operations may be used to register any of the other computing elements in the computing environment.

As depicted, operation 300 includes receiving (301) a request from a computing element to join the private communication network and identifying (302) credential information associated with a user of the computing element and device information associated with the computing element. In some implementations, a computing element may execute a service that obtains user credentials associated with the user and be used to authorize the user to join a private network. In some examples, the user credentials received at the computing device may be provided to a service that can authenticate the user and provide a token or second credential to use in association with the coordination service. The service may be part of coordination service or may comprise an external service in some examples. In addition to the credentials that are used to authenticate the user, the computing element may further provide device information that can be used to identify characteristics of the device. The device information may include hardware information, operating system information, service information, devices coupled to the computing element (e.g., printers, storage, and the like), or some other information.

Once the request is received with the credential information, operation 300 further identifies (303) communication rules associated with the computing element based on the credential information and the device information. In some implementations, one or more administrators may define rules that associate user identifiers and device information with permissions to communicate with one or more other computing elements. Each of the rules may identify source and destination users available to communicate, device type information available to communicate, services on the computing elements available to communicate, or some other information. For example, a rule may permit users associated with human resources to access a database with employee information. The rule may include identifiers for the users (e.g., user group associated with human resources), the types of devices for the user permitted to the communicate with the server, and identifier information for the server (including an administrator associated with the server or some other information).

Once the one or more rules are identified in association with the registering computing element, operation 300 further identifies (304) communication information that permits the computing element to communicate with one or more other computing elements in the private communication network based on the communication rules and communicates (305) the communication information to the computing element. In some implementations, each of the communication rules may identify device type information and user groups, wherein multiple devices may correspond to the device type information and user groups. Coordination service 120 may first use ACL store 128 to identify the rules associated with a newly registering computing element. Once the rules are identified, coordination service 120 may identify communication information for one or more other computing elements that qualify for the identified rules, wherein the one communication information for the one or more other computing elements may be stored in data store 126. In some examples, when a computing element registers with coordination service 120, the computing element may provide communication information including addressing information, encryption information, or any other information that can permit other computing elements to send and receive packets to the registering computing element. Once the communication information is identified for the one or more other computing elements in the private network with permissions to communicate with the registering computing element, the communication information may be provided to the requesting computing element. Additionally, coordination service 120 may provide communication information to the one or more other computing elements, permitting the one or more other computing elements to communicate with the registering computing element. In some examples, the communication information may define permitted ports that are available on each of the computing elements. For example, a rule may permit communications to be sent to a first port on another computing element, but prevent communication directed to any other ports on the other computing element.

As an illustrative example, computing element 110 may generate a request to join a private network, wherein coordination service 120 may identify device information and credential information (user identifier) associated with computing element 110. In response to the request, coordination service 120 may refer to ACL store 128 to identify one or more rules associated with the registration information from computing element 110. In some implementations, the rules may correspond to individual users and/or device types. For example, each rule may include unique attributes associated with devices and/or users. In other implementations, one or more of the rules may permit multiple devices to apply to the rule. For example, a rule may permit users associated with a user group (e.g., human resource, engineering, or some other group of users) to communicate with one or more other computing elements. Additionally, computing elements may be grouped by type. For example, user computing system may be allocated different rules than servers or mobile devices. In some implementations, the user information provided to the coordination service may comprise user group information. For example, when a user provides credentials to a secondary service, such as corporate login, the credentials may be associated with a user group (e.g., engineering, legal, etc.) and the coordination service may use the user group information to identify rules that correspond to the user group.

Once the rules are identified in association with computing element 110, coordination service 120 may identify communication information associated with one or more computing elements in the identified rules. For example, computing element 110 may be permitted to access databases provided by computing elements 112-114 based on communication rules identified in ACL store 128. The rules may group computing elements 112-114 together based on device type (device type 141) or based on the one or more users associated with computing elements 112-114. Once the computing elements are identified, coordination service 120 may identify communication information associated with the computing elements, wherein the communication information may include addressing for computing elements 112-114, encryption information for ingress and egress packets to computing elements 112-114, services available for the computing elements, or some other information. In some examples, the rules may limit the types of communication between the computing elements including limiting outgoing requests to a computing element, limiting services available on a receiving computing element, limiting the types of requests that can be communicated to a computing element, or some other rules to limit the communications. For example, a rule may be used to prevent outgoing requests from a server computing element but permit incoming requests from client computing elements or user devices.

In some implementations, each computing element may be assigned a unique IP address in a subnet of IP addresses by the coordination service. When a communication is required by computing element 110, the computing elements may use an IP address in the subnet for another computing element, such as computing element 112. Once the communication request is identified, computing element 110 may perform network address translation based on the destination IP address and use the translated address in the header of the encrypted packet. For example, a packet may use 100.64.10.2 that is a unique IP address in the private network subnet for computing element 112. Once identified, the packet may be encrypted, and public IP addresses associated with the computing elements may be added to the header to communicate the packet to the destination computing element. In some examples, the communications may be limited via ports on the sending and receiving computing elements, wherein the communication information may indicate the available ports on each of the computing elements.

In at least one example, one or more of the computing elements may act as a relay for other computing devices. The computing element may comprise a router, a desktop computing system, or some other computing element. For example, a router may receive a communication from another computer on the same local network that includes an IP address assigned in the subnet for the private network. In response to identifying the communication, the router may determine whether the communication is permitted based on the communication information from the coordination service and apply any required actions to the packet prior to communicating the packet to destination computing element. These actions may include encrypting the packet, adding public addressing information, or providing some other operation on the packet.

Figure 4:
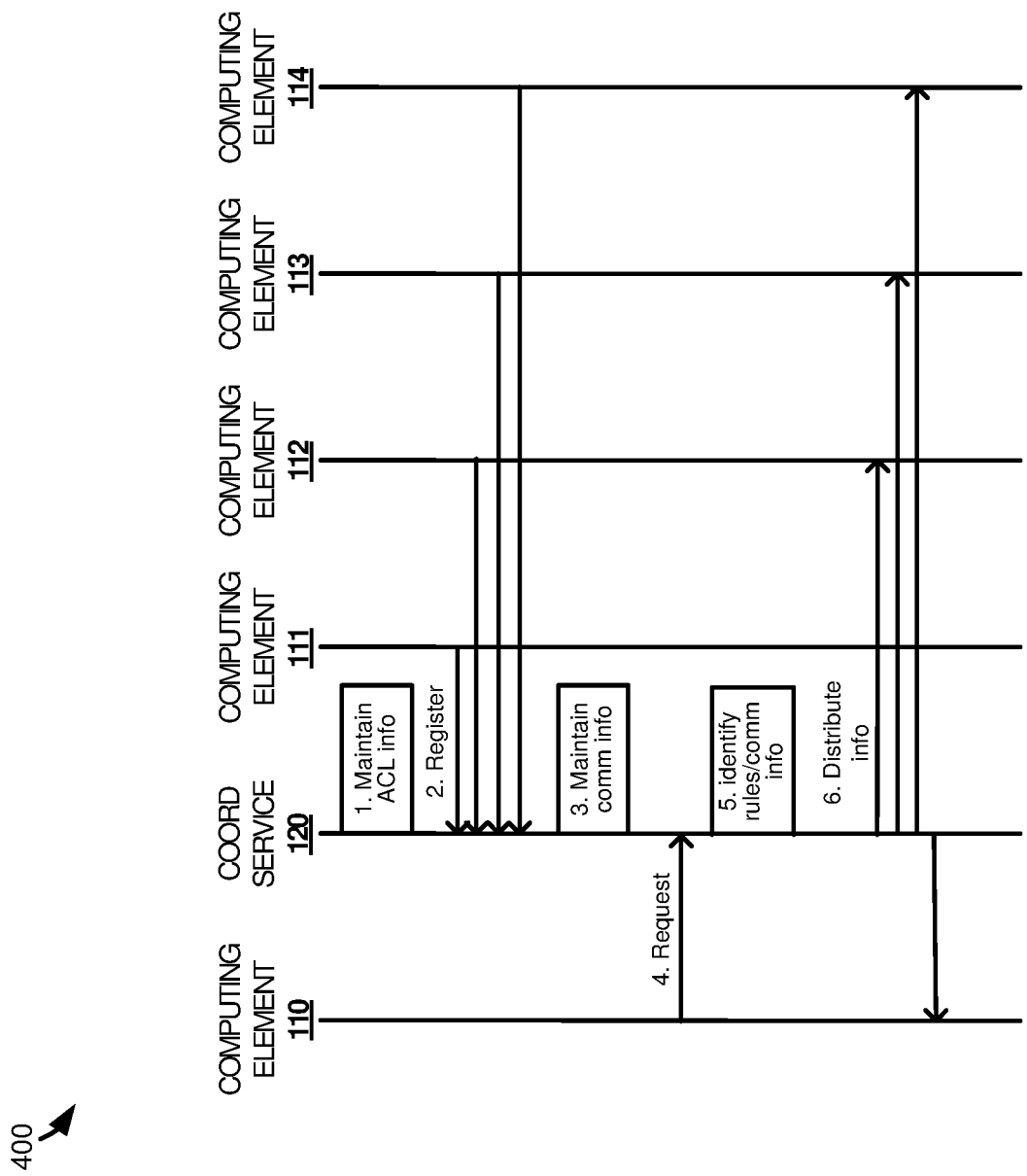
FIG. 4 illustrates a timing diagram to manage security and accessibility between computing elements of a computing environment according to an implementation.

FIG. 4 illustrates a timing diagram 400 to manage security and accessibility between computing elements of a computing environment according to an implementation. Timing diagram 400 includes computing elements 110-114 and coordination service 120 from computing environment 100 of FIG. 1. Computing element 115 has been omitted for clarity.

In timing diagram 100, coordination service 120 may maintain, at step 1, ACL information that can define communication rules for devices in a private network. Each of the communication rules may be used to define source and destination users or user groups permitted to communicate, device information for devices permitted to communicate, limitations to services or applications permitted to communicate, or some other communication rule, including combinations thereof. As the rules are maintained by coordination service 120, computing elements 111-114 may register, at step 2, with the private network managed by coordination service 120. In some examples, this registration may be used to provide credentials associated with the user to authenticate the user and device information associated with each computing element of computing elements 111-114. As each of the computing elements are registered, coordination service 120 may maintain communication information in a database, at step 3, wherein the communication information may include addressing information associated with each of the computing elements, encryption information associated with each of the computing elements, available services on the computing elements, or some other information for communicating with the computing elements. In some implementations, the communication information may be static, however, it should be understood that each of the computing elements may update the communication information at periodic intervals, when changing local area networks (LANs) or wireless area networks, or at some other interval.

As the information is maintained, computing element 110 may communicate a request, at step 4, to join the private network, wherein computing elements 110-114 may be distributed across multiple physical locations and local area networks. In response to the request, coordination service 120 may identify rules and communication information that correspond to the request. In some implementations, when a computing element requests to join the private network, coordination service 120 may identify credentials associated with the user and device information associated with the user. The credentials may include a username and password, a token, a cookie, or some other credential capable of authenticating the user at coordination service 120. In response to authenticating the user or determining that the computing element is permitted to join the private network, coordination service 120 may determine one or more communication rules associated with the requesting computing element. In some examples, the communication rules may be associated with individual users of the private network. In other examples, the communication rules may be defined based on user groups to which one or more users may be assigned. The rules may also define device information to qualify for a rule, wherein a smartphone may be allocated different communication rules than a desktop computing system. For example, in computing environment 100 computing elements of device type 140 may be allocated different communication rules than computing elements of device type 141.

Once the rules are identified, coordination service 120 may identify one or more other computing elements in the corresponding rules to communicate with computing element 110. Here, coordination service 120 determines that computing elements 112-114 are associated with rules for computing element 110. These computing elements may permit outgoing communication requests from computing element 110 to one of computing elements 112-114, may permit incoming communication requests from computing elements 112-114, or may provide some other communication rule. For example, computing element 110 may be permitted to initiate a communication with computing elements 112-114, but computing elements 112-114 may not be permitted to initiate a communication with computing element 110.

In some examples, the communications may limit requests associated with a particular service or application at the sending computing element or the receiving computing element. For example, computing element 110 may be associated with a rule that only permits incoming connection requests from computing elements 112-114. After the communication information is determined for the newly registered computing element 110, coordination service 120 may distribute the communication information associated with computing elements 112-114 to computing element 110. Additionally, coordination service 120 may provide communication information about computing element 110 to computing elements 112-114, wherein the communication information may be used to identify communications from computing element 110, direct communications to computing element 110, decrypt payloads from computing element 110, or provide some other operation.

In some examples, each of the computing elements may execute a local service or application capable of monitoring communications for the computing elements and managing the connections between the computing elements. In one implementation, once the computing elements are configured, computing element 110 may identify a communication from computing element 110 directed to computing element 112, wherein the request may use a URL, a local address, or some other identifier associated with computing element 112. In response to the request, the local private network service on computing element 110 may apply any communication information to the communication and transfer the communication to computing element 112. The application of the communication information may include translating any addressing in the request to a corresponding address for computing element 112, applying any encryption to the communication, or providing some other operation for the communication. Similarly, when a communication is received, the service on computing element 110 may check addressing in the communication, determine any decryption to be applied to the payload of the communication and forward the communication to the desired application or service on computing element 110.

In some implementations, when a computing element attempts to register with the coordination service, the computing element may provide addressing information associated with the computing element, wherein the addressing may comprise a local or private network address associated with the computing element, a public IP address associated with the computing element, ports available on the computing element, or some other addressing information. The coordination service may further allocate an IP address for the private network from a subnet for the private network. Advantageously, even if the computing element changes public IP addresses, the address allocated from the coordination service may be constant. When a communication is required between computing elements in the private network, the application requiring the application may use the address allocated in the private network subnet. Once the communication is identified from the application, the computing element may determine whether the communication is permitted and, when permitted, apply changes to the communication based on the information provided from the coordination service. The changes may include NAT, encryption, encapsulation, and the like. In at least one example, the computing element may encrypt the communication and add header information in association with the public addressing information for the computing element. Once the communication is received by the receiving computing element, the receiving computing element may identify encryption information associated with the sending computing element (based on the port and/or source IP address) and may apply the encryption keys to decrypt the packet. Once decrypted the receiving computing element may forward the decrypted packet to the destination application or service. In some implementations, the destination may comprise another computing element, wherein the computing element applying the encryption keys may comprise a relay (e.g., router to computing element). In the relay example, a single computing element may support the private network operations for a plurality of devices, wherein the computing element may enforce communication rules provided by the coordination service.

Figure 5:
FIG. 5 illustrate a data structure for managing communication rules according to an implementation.

FIG. 5 illustrate a data structure 500 for managing communication rules according to an implementation. Data structure 500 includes columns for the sending computing element 550, receiving computing element 551, and actions 552. Data structure further includes device types 520-524, user(s) 510-519, and actions 530-534.

As described herein, a coordination service may maintain a data structure 500 or access control list that defines permissions for computing elements to communicate with one another in a private network, wherein the computing elements may reside in one or more geographic locations or one or more private networks. The communication rules may be used to define users and computing device types that are permitted to communicate and the types of communications that are permitted. For example, referring to the first entry in data structure 500, device type 520 with user(s) 510 may communicate with device type 520 with user(s) 515, wherein action 530 may permit all types of communications, prevent all types of communications, or permit specific types of communications. As an example, a computing element associated with a user of user(s) 510 may initiate a connection with a computing element associated with a user of user(s) 515, while a reverse connection may not be initiated from user(s) 515 to user(s) 510.

In some implementations, when a new computing element registers with the private network, the coordination service may identify one or more rules that apply to the computing element based on information about the device and information about the user. In particular, the coordination service may traverse data structure 500 to identify rules that correspond to at least the user and in some examples the device type for the user. Once the rules are identified, the coordination service may identify one or more other computing elements for which the newly registering computing element may communicate based on the rules. Additionally, the coordination service may identify communication information that permits the newly registering computing element to communicate with the one or more other computing elements. The communication information may include encryption keys, addressing information, or some other information that can be provided to the registering computing element to communicate in the private network.

In some examples, the coordination service may maintain a subnet of addresses that can be allocated to computing elements in the private network. Advantageously, applications on the computing elements or associated with the computing elements may use the private network subnet addresses from the coordination service and the computing element may NAT the destination address to another address, encrypt the packet for encapsulation, and forward the encapsulated packet with the translated address to the destination computing element.

Figure 6:
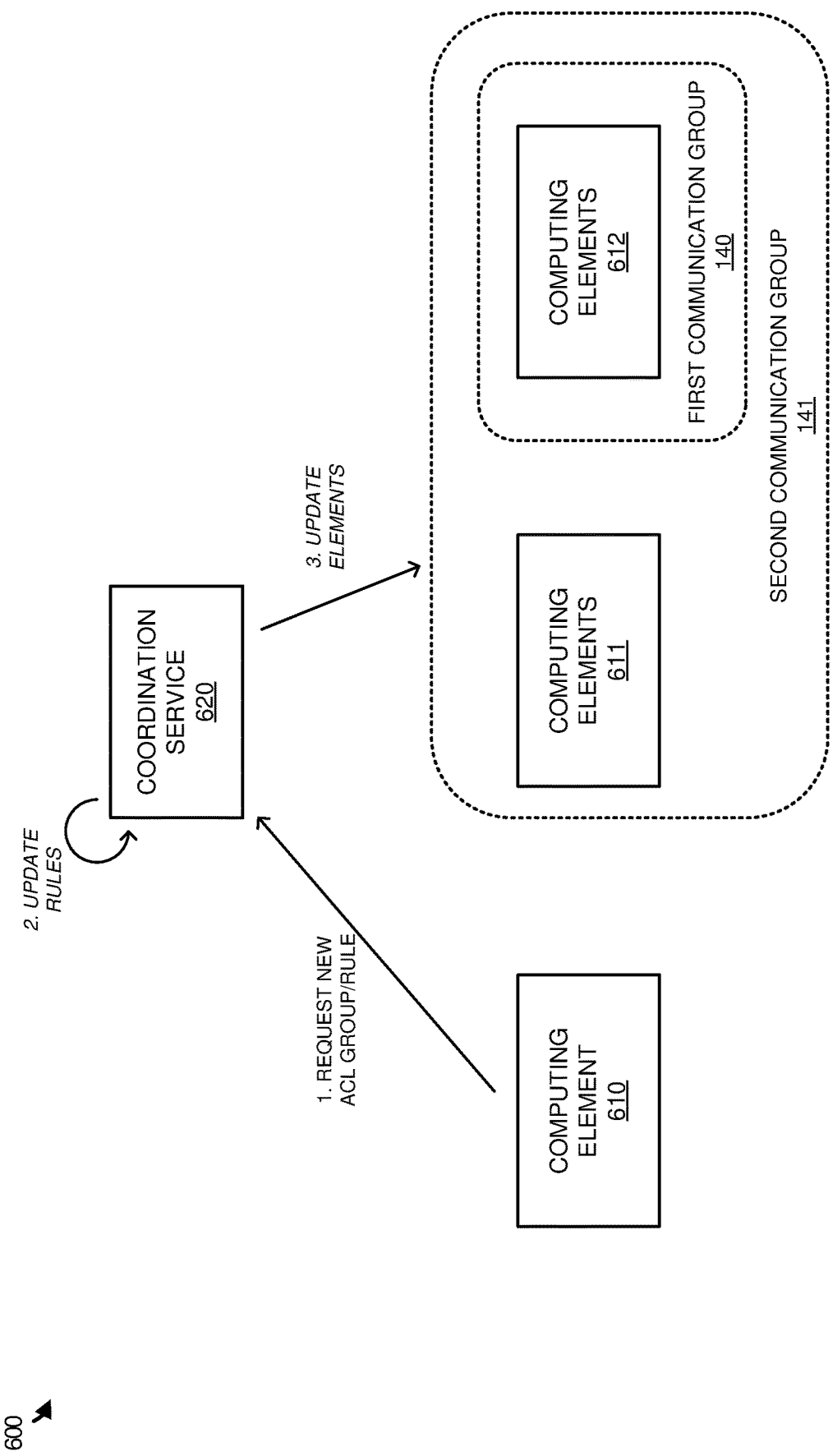
FIG. 6 illustrates an operational scenario of updating communication rules for a computing network according to an implementation.

FIG. 6 illustrates an operational scenario 600 of updating communication rules for a computing network according to an implementation. Operational scenario 600 includes computing elements 610-612 and coordination service 620.

In implementing a private computing network, a coordination service 620 may be used to maintain and distribute communication information to computing elements in the private computing network. Here, computing elements 610-

612 may represent one or more user groups for a private network, wherein the computing elements may each correspond to one or more computing elements as part of a group. When a computing element joins the network, the computing element may be allocated permissions that permit the computing element to communicate with one or more other computing elements in the computing environment. In some implementations, a computing element may be provided with permissions to interact with coordination service 620 to add, remove, or modify the communication rules associated the private network.

Here, computing element 610 may communicate with coordination service 620 to modify at least a portion of the rules associated with computing elements 611-612. It should be understood that computing elements 611-612 may represent a portion of the private network and one or more additional computing elements may also communicate in the private network although not shown. In at least one implementation, computing element 610 may represent an administrative computing element for the private network, wherein the administrative computing element may update communication rules for related computing elements. For example, in an organization, computing element 610 may represent a computing system for an administrator with permissions to update rules associated with human resources. As a result, the administrator associated with computing element 610 may provide, at step 1, an update that can modify, at step 2, one or more rules to chance first communication group 140 to second communication group 141. The update may include adding computing elements based on the device type, based on the users or user group with the computing elements, or based on some other factor. For example, the update may add one or more users to a user group, such as the user group represented by computing elements 612. Once the rules are updated, coordination service 620 may identify communication information to be distributed to at least computing elements 611-612 based on the rule modification and update, at step 3, the communication information at computing elements 611-612. In some examples, the update may include providing additional communication information to computing elements 611 that permits computing elements 611 to communicate with the same computing elements as computing elements 612. The information may include encryption information, addressing, network translations, or some other information.

In some implementations, when a computing element registers with the coordination service, the coordination service may provide communication information that permits the computing element to communicate with other computing elements in the private network. The communication information may include addressing, encryption, or other information that permits the computing element to communicate with the other computing elements. In addition to the communication information, a computing element may be provided with permissions that permit the computing element to update the communication rules for at least a portion of the computing elements in the private network. For example, an administrator may be provided with permissions to access coordination service 620 and update communication rules associated with at least computing elements 611-612. From the permissions, the administrator at computing element 610 may define user groups, may define device types, communication actions (permit, block, etc.), or other similar information in association with computing elements available to the administrator. In some examples, the administrator may update rules associated with the entire private network. In other examples, one or more administrators may define rules for a portion of the network, such as a subset of devices or user groups.

Figure 7:
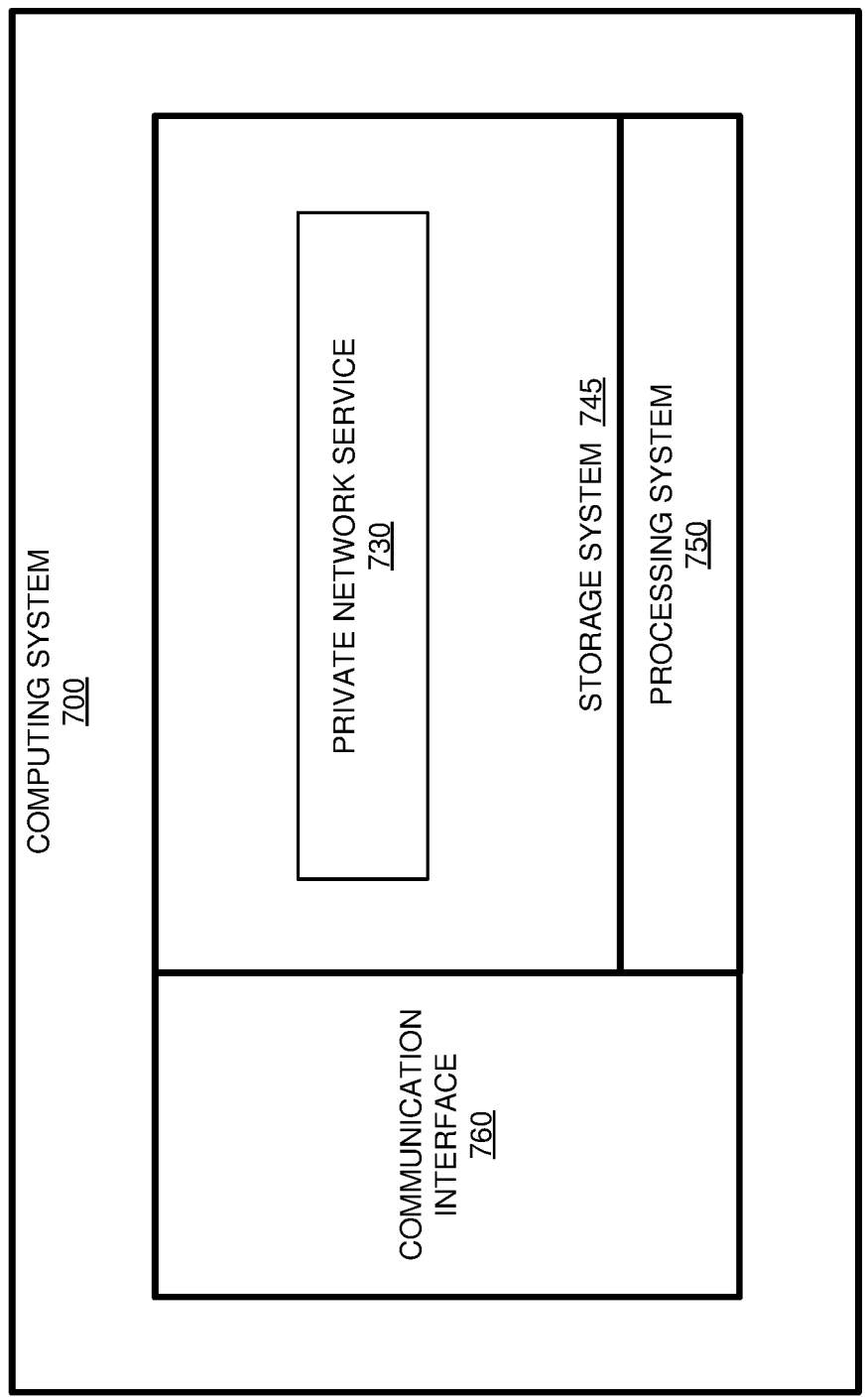
FIG. 7 illustrates a computing system to manage private network connections according to an implementation.

FIG. 7 illustrates a computing system 700 to manage private network connections according to an implementation. Computing system 700 is representative of any computing system or systems with which the various operational architectures, processes, scenarios, and sequences disclosed herein for a computing element can be implemented. Computing system 700 is an example computing element of computing elements 110-115, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with computing elements in the same private network, a coordination service, and an intermediary relay server, wherein the relay server can support connections between computing elements. For example, the relay server may be used to support connections where a firewall may block connections directly between computing elements.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises private network service 730 capable of providing at least operation 200 of FIG. 2. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, private network service 730 may direct processing system 750 to obtain credential information associated with a user at the computing element. Once obtained, private network service 730 may provide a request to a coordination service to register with a private network supported by the coordination service. In some examples, the coordination service itself may authenticate the user credentials, however, it should be understood that third-party services may authenticate the user of computing system 700. In some examples, in addition to authenticating the user via credentials, computing system 700 may further provide information about the device including hardware information, software information, services available on the device, or some other information.

Once the information is provided to the coordination service, the coordination service may distribute communication information to computing system 700 when the computing system is authorized to join the private network. The communication information may be used by private network service 730 to communicate with one or more other computing elements, wherein the communication information may include addressing information (IP addresses, ports, network translations, or some other addressing) encryption, or some other information associated with the communication. When a communication is required, private network service 730 may identify that the destination for the communication is in the private network based address translation, a URL, or some other information in the request and may apply the communication information to communicate with the destination computing element. In applying the communication information, private network service may direct processing system 750 to use an IP address associated with the destination computing element, encrypt the payload in accordance with any communication information, or provide some other operation to communicate with the other computing element. In some implementations, the communications may be direct between computing elements, however, it should be understood that packets may be forwarded over a relay server in some examples based on the communication information provided by the coordination service. The relay server may be used when two communicating computing elements are behind firewalls and each of the computing elements establishes a connection with the relay server. As a result, the relay server may forward packets from a sending computing element to a destination computing element.

Figure 8:
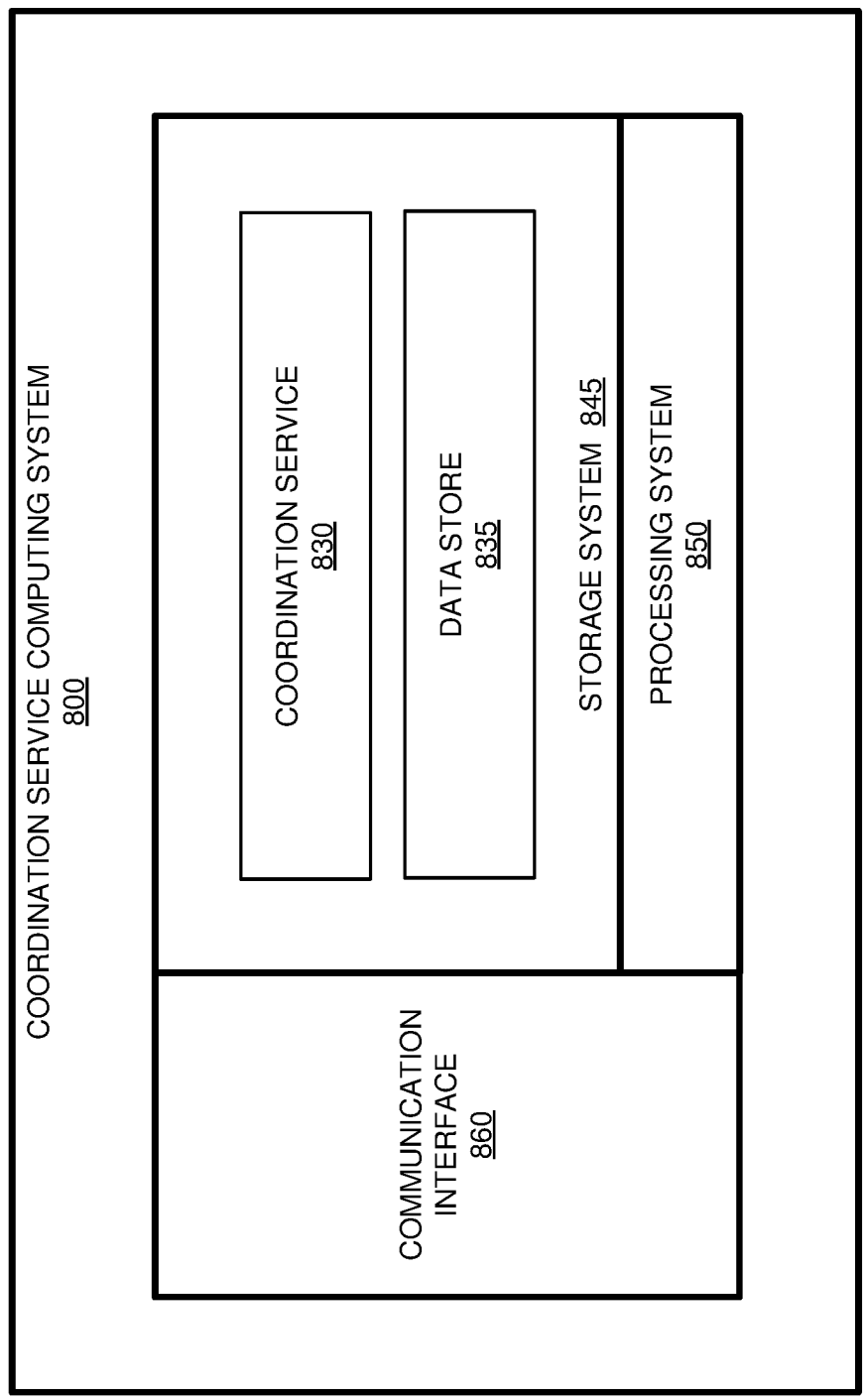
FIG. 8 illustrates a coordination service computing system to distribute and maintain private network information according to an implementation.

FIG. 8 illustrates a coordination service computing system 800 to distribute and maintain private network information according to an implementation. Computing system 800 is representative of any computing system or systems with which the various operational architectures, processes, scenarios, and sequences disclosed herein for a coordination service can be implemented. Computing system 800 is an example of coordination service 120 of FIG. 1, although other examples may exist. Computing system 800 includes storage system 845, processing system 850, and communication interface 860. Processing system 850 is operatively linked to communication interface 860 and storage system 845. Communication interface 860 may be communicatively linked to storage system 845 in some implementations. Computing system 800 may further include other components such as a battery and enclosure that are not shown for clarity.

Communication interface 860 comprises components that communicate over communication links, such as network cards, ports, radio frequency (RF), processing circuitry and software, or some other communication devices. Communication interface 860 may be configured to communicate over metallic, wireless, or optical links. Communication interface 860 may be configured to use Time Division Multiplex (TDM), Internet Protocol (IP), Ethernet, optical networking, wireless protocols, communication signaling, or some other communication format—including combinations thereof. Communication interface 860 is configured to communicate with physical and/or virtual computing elements in one or more private networks.

Processing system 850 comprises microprocessor and other circuitry that retrieves and executes operating software from storage system 845. Storage system 845 may include volatile and nonvolatile, removable and non-removable media implemented in any method or technology for storage of information, such as computer readable instructions, data structures, program modules, or other data. Storage system 845 may be implemented as a single storage device but may also be implemented across multiple storage devices or sub-systems. Storage system 845 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 850 is typically mounted on a circuit board that may also hold the storage system. The operating software of storage system 845 comprises computer programs, firmware, or some other form of machine-readable program instructions. The operating software of storage system 845 comprises coordination service 830 capable of providing at least operation 300 of FIG. 3. The operating software on storage system 845 may further include an operating system, utilities, drivers, network interfaces, applications, or some other type of software. When read and executed by processing system 850, the operating software on storage system 845 directs computing system 800 to operate as described herein.

In at least one implementation, coordination service 830 directs processing system 850 to a request from a computing element to join the private communication network, wherein the request indicates credential information associated with a user of the computing element and device information associated with the computing element. The credential information may include any information to identify the user joining the service, including username, password, token, or some other information. The device information may include hardware information, operating system information, service information, or some other information associated with the computing element.

In response to the request, coordination service 830 directs processing system 850 to identify communication rules associated with the computing element based on the credential information and the device information and identify communication information that permits the computing element to communicate with one or more other computing elements in the private communication network based on the communication rules. In some implementations, data store 835 may store ACLs that represent communication rules for computing elements in a private network. The communication rules may define user groups, types of devices, types of communications, and the like that are permitted to communicate in the private network. For example, a communication rule may permit all types of communications from a first user group, representing user devices, to a second user group, representing a database for the first user group. As the communication rules are identified for a requesting computing element, computing system 800 may identify one or more other computing elements that the newly registering computing element can communicate with based on the communication rules. For example, if the new computing element corresponded to the first user group in the previous example, the one or more other computing elements may comprise servers that provide the database in the second user group. Once the one or more other computing elements are identified, communication information about the one or more computing elements may be provided by coordination service 830 to the registering computing element. The communication information may include addressing information, encryption information, available service information, permitted connections, or some other information.

In some examples, the communication information may be provided by each computing element when the computing element registers with the coordination service. In particular, the computing element may provide addressing information associated with the computing element, public encryption information for communications from the computing element, services provided by the computing element, or some other information. In some implementations, the computing elements may update the communication information at intervals, wherein the intervals may be periodic, may occur when a computing element identifies a change in the communication information (e.g., joins a new network, allocated a new IP address, and the like), or at some other interval. When changes occur or when a new computing element joins the private network, the coordination service may distribute updates to other computing elements in the computing environment. For example, when a new computing element joins the private network, the coordination service may identify one or more other computing elements capable of communicating with the new computing element and may distribute communication information for the new computing element to the one or more other computing elements. Similarly, when changes are made to the communication rules or computing elements are removed from the network, updates may be provided to one or more computing elements involved in the rule modifications or the removal of the computing element.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a coordination service for a private communication network of connected computing elements, the method comprising:
   receiving a request from a computing element to join the private communication network, wherein the request indicates credential information associated with a user of the computing element and device information associated with the computing element, wherein the device information comprises at least an operating system identifier for an operating system on the computing element;
   identifying communication rules associated with the computing element based on the credential information and at least the operating system identifier from the device information, wherein the communication rules define one or more other computing elements of the connected computing elements available to the computing element in the private communication network;
   identifying communication information that permits the computing element to communicate with the one or more other computing elements in the private communication network based on the communication rules, wherein the communication information comprises one or more encryption keys and one or more addresses associated with the one or more other computing elements; and
   limiting the computing element to communicating with the one or more other computing elements over the private communication network by communicating the communication information to the computing element and communicating second communication information to at least a portion of the one or more other computing elements, wherein the computing element requires additional communication information to communicate with ones of the connected computing elements other than the one or more other computing elements, and wherein the second communication information includes encryption information for packets communicated to the computing element.

2. The method of claim 1, wherein the device information further comprises services available on the computing element and hardware available on the computing element.

3. The method of claim 1, wherein the computing element comprises a user computing device, a server, a virtual machine, or a container.

4. The method of claim 1, wherein the one or more addresses comprises one or more internet protocol (IP) addresses and one or more port numbers associated with the one or more other computing elements.

5. The method of claim 1 further comprising:
   receiving the second communication information, wherein the second communication information comprises addressing for the computing element.

6. The method of claim 5 further comprising:
   determining the at least a portion of the one or more other computing elements based on the communication rules.

7. The method of claim 1 further comprising:
   identifying an update to the communication rules associated with the computing element;
   identifying an update to the communication information for the computing element based on the update to the communication rules; and
   communicating the update to the communication information to the computing element.

8. The method of claim 7, wherein the update to the communication rules comprises an addition of a rule, a removal of a rule, or a modification to a rule.

9. A computing apparatus comprising:
   a storage system comprising non-transitory computer readable storage media;
   a processing system comprising microprocessor circuitry and operatively coupled to the storage system; and program instructions stored on the storage system that, when executed by the processing system, direct the computing apparatus to:
  receive a request from a computing element to join a private communication network of connected computing elements, wherein the request indicates credential information associated with a user of the computing element and device information associated with the computing element, wherein the device information comprises at least an operating system identifier for an operating system on the computing element;
  identify communication rules associated with the computing element based on the credential information and at least the operating system identifier from the device information, wherein the communication rules define one or more other computing elements of the connected computing elements available to the computing element in the private communication network;
  identify communication information that permits the computing element to communicate with the one or more other computing elements in the private communication network based on the communication rules, wherein the communication information comprises one or more encryption keys and one or more addresses associated with the one or more other computing elements; and
  limit the computing element to communicating with the one or more other computing elements over the private communication network by communicating the communication information to the computing element and communicating second communication information to at least a portion of the one or more other computing elements, wherein the computing element requires additional communication information to communicate with ones of the connected computing elements other than the one or more other computing elements, and wherein the second communication information includes encryption information for packets communicated to the computing element.

10. The computing apparatus of claim 9, wherein the device information further comprises services available on the computing element and hardware available on the computing element.

11. The computing apparatus of claim 9, wherein the computing element comprises a user computing device, a server, a virtual machine, or a container.

12. The computing apparatus of claim 9, wherein the one or more addresses comprises one or more internet protocol (IP) addresses and one or more port numbers associated with the one or more other computing elements.

13. The computing apparatus of claim 9, wherein the program instructions further direct the computing apparatus to:
  receive the second communication information, wherein the second communication information comprises addressing for the computing element.

14. The computing apparatus of claim 13, wherein the program instructions further direct the computing apparatus to:
  determine the at least a portion of the one or more other computing elements based on the communication rules.

15. The computing apparatus of claim 9, wherein the program instructions further direct the computing apparatus to:
  identify an update to the communication rules associated with the computing element;
  identify an update to the communication information for the computing element based on the update to the communication rules; and
  communicate the update to the communication information to the computing element.

16. The computing apparatus of claim 15, wherein the update to the communication rules comprises an addition of a rule, a removal of a rule, or a modification to a rule.

17. A system comprising:
  a plurality of computing elements comprising a plurality of computers connected over a private communication network; and
  a coordination service computer configured to:
    receive a request from a first computing element of the plurality of computing elements to join a private communication network, wherein the request indicates credential information associated with a user of the first computing element and device information associated with the first computing element, wherein the device information comprises at least an operating system identifier for an operating system on the first computing element;
    identify communication rules associated with the first computing element based on the credential information and at least the operating system identifier from the device information, wherein the communication rules define one or more other computing elements of the plurality of computing elements available to the first computing element in the private communication network;
    identify communication information that permits the first computing element to communicate with the one or more other computing elements of the plurality of computing elements in the private communication network based on the communication rules, wherein the communication information comprises one or more encryption keys and one or more addresses associated with the one or more other computing elements; and
    limit the computing element to communicating with the one or more other computing elements over the private communication network by communicating the communication information to the first computing element and communicating second communication information to at least a portion of the one or more other computing elements, wherein the first computing element requires additional communication information to communicate with ones of the plurality of computing elements other than the one or more other computing elements, and wherein the second communication information includes encryption information for packets communicated to the computing element.

18. The system of claim 17, wherein the first computing element comprises a user computing device, a server, a virtual machine, or a container.

* * * * *